United States Patent [19]

Gottsegen et al.

[11] Patent Number: 4,465,904
[45] Date of Patent: Aug. 14, 1984

[54] PROGRAMMABLE ALARM SYSTEM

[76] Inventors: Ronald B. Gottsegen, 24900 Pine Hills Dr., Carmel, Calif. 93923; John G. Pate, 1180 Sylvan Pl., Monterey, Calif. 93940

[21] Appl. No.: 271,227

[22] Filed: Jun. 8, 1981

Related U.S. Application Data

[63] Continuation of Ser. No. 947,263, Sep. 29, 1978, abandoned.

[51] Int. Cl.³ .................................................. H04M 11/04
[52] U.S. Cl. ..................................... 179/5 R; 340/518
[58] Field of Search .......... 179/5 R, 5 P, 2 A, 2 AM, 179/1 MN; 340/505, 518

[56] References Cited

U.S. PATENT DOCUMENTS

| | | | |
|---|---|---|---|
| 3,538,257 | 11/1970 | Wright, Jr. et al. | 179/5 P |
| 3,549,810 | 12/1970 | Driscoll | 179/5 R |
| 3,710,024 | 1/1973 | Lacey | 179/5 R |
| 4,044,351 | 8/1977 | Everson | 340/408 |
| 4,056,684 | 11/1977 | Lindstrom | 179/5 R |

Primary Examiner—Joseph A. Popek
Attorney, Agent, or Firm—Paul B. Fihe

[57] ABSTRACT

The invention involves a programmable alarm system including a local communicator having one or more sensors responsive to problem situations such as illegal intrusion, fire, panic or the like, which can be installed in a residence, office or other premises to sense a problem situation, and after conversion to a digital format transmit the information through a telephone line to a central receiver for temporary and permanent display of the location of the residence or other premise and the particular problem encountered. The communicator operation and sensor characteristics can be programmed for each location by temporary attachment of a programmer unit, thus to provide flexibility. In addition, in the event that the integrity of the system is interrupted (e.g., line severance), a separate redundant system is rendered operative to indicate the problem situation.

14 Claims, 9 Drawing Figures

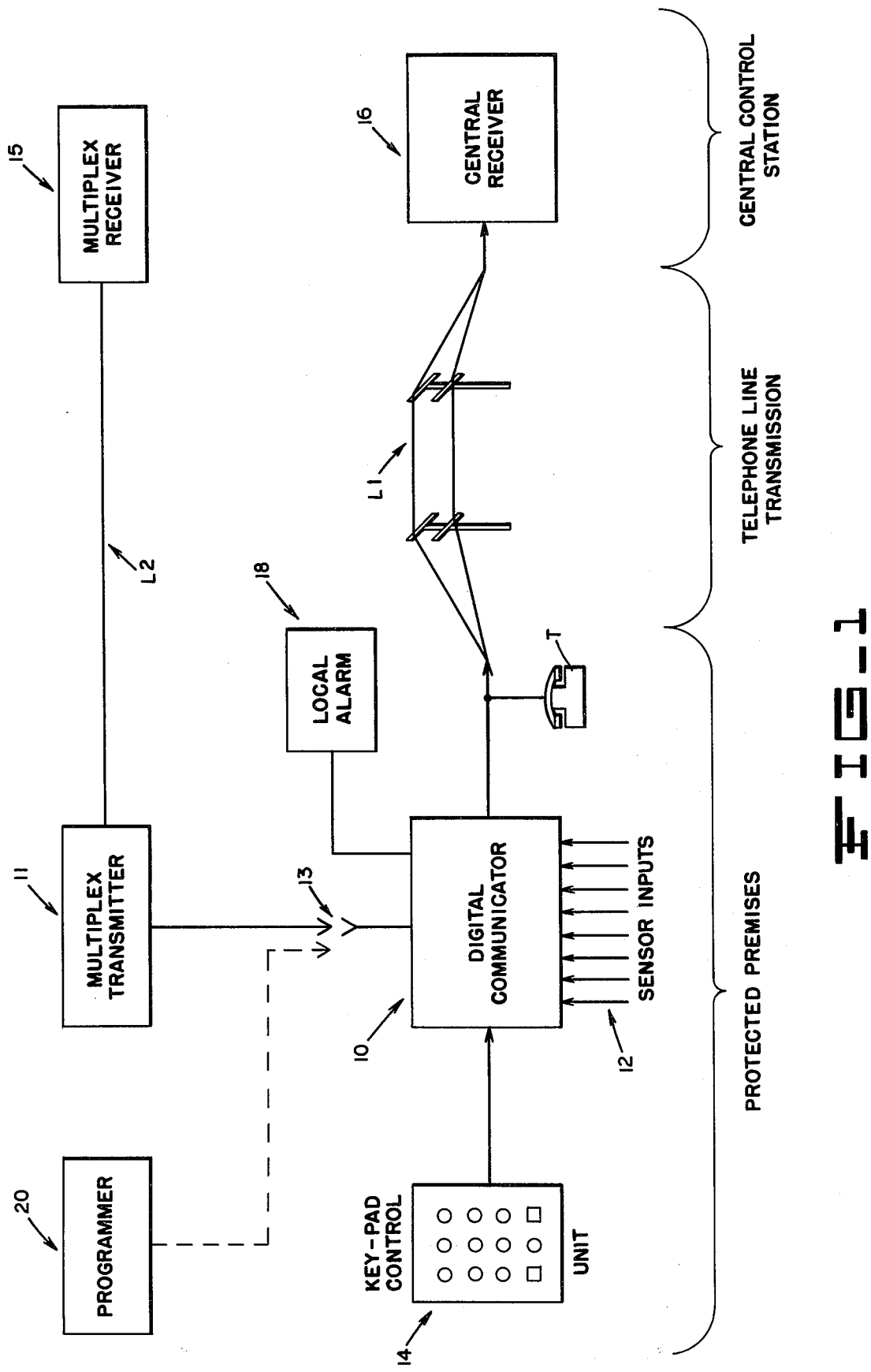

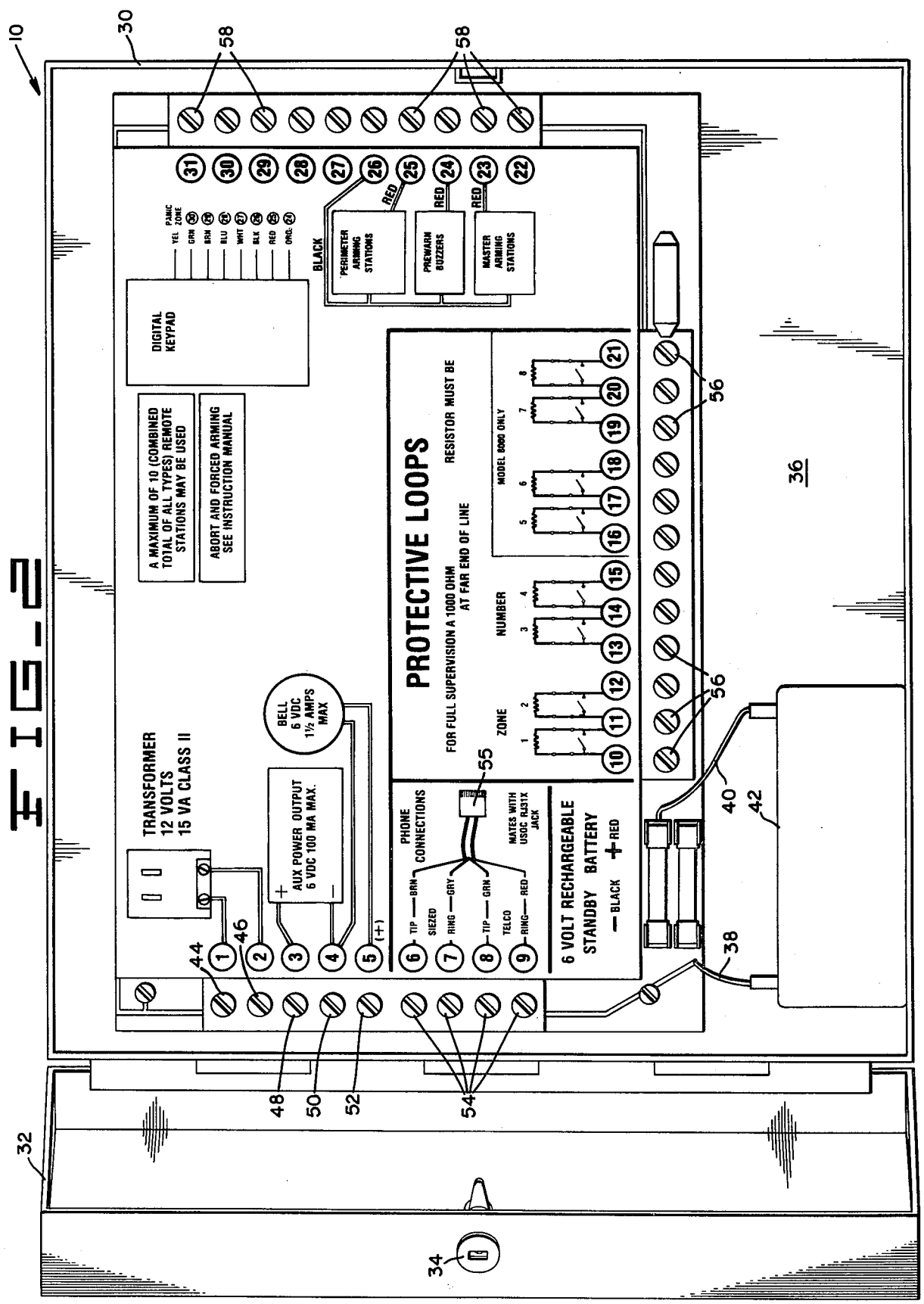

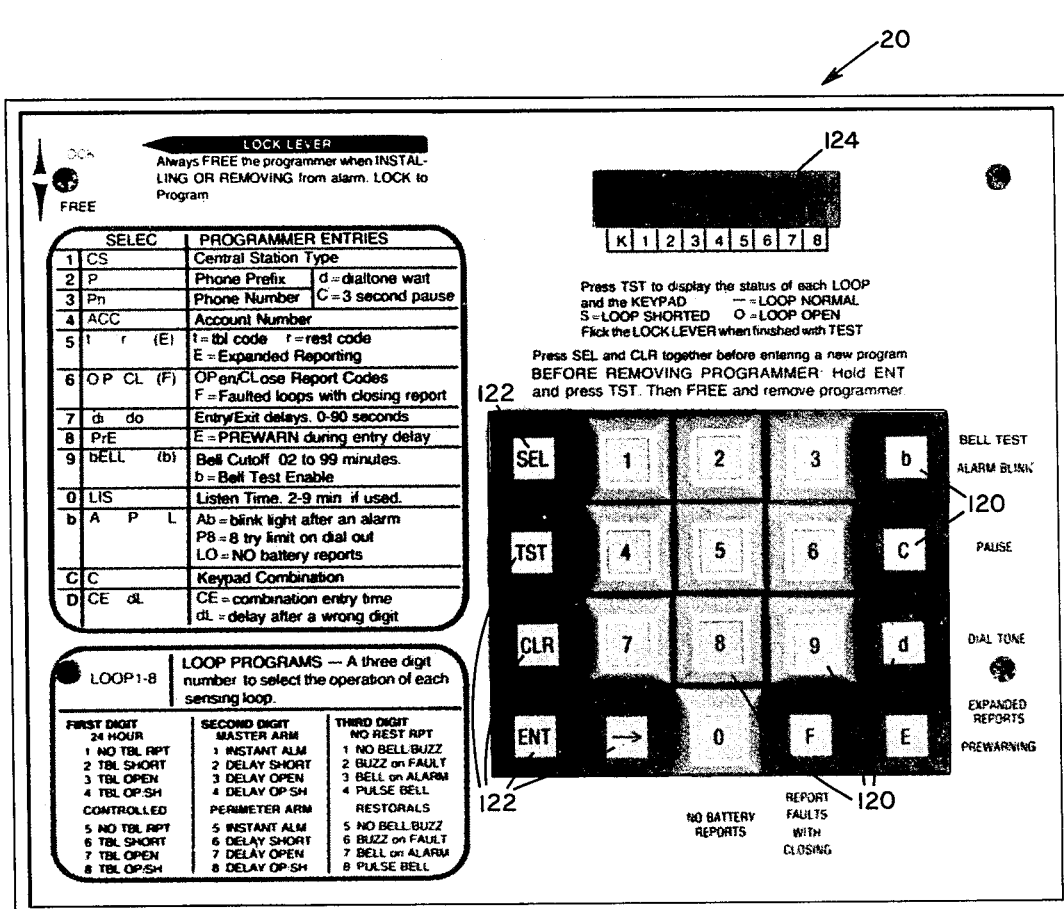
FIG_3

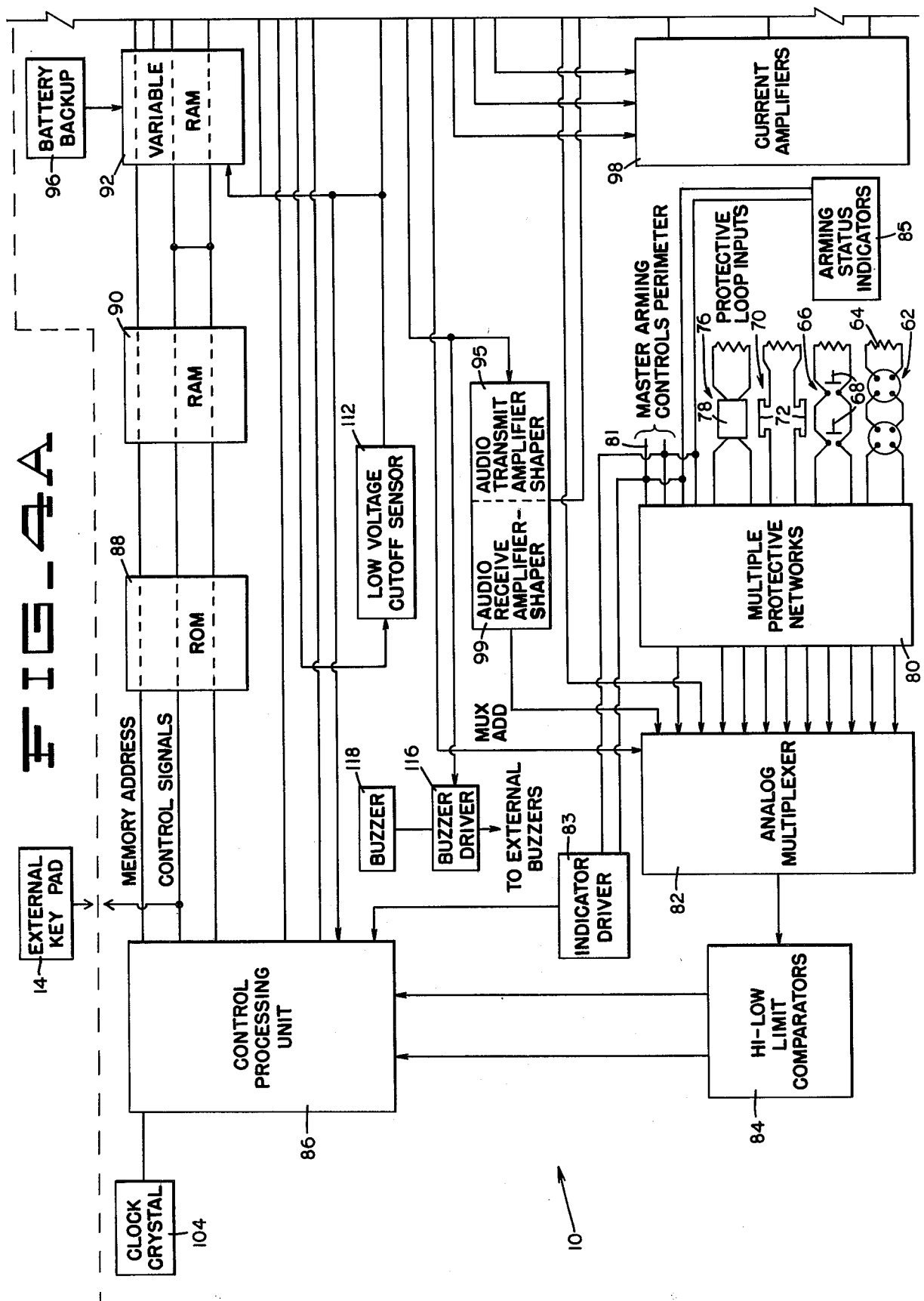

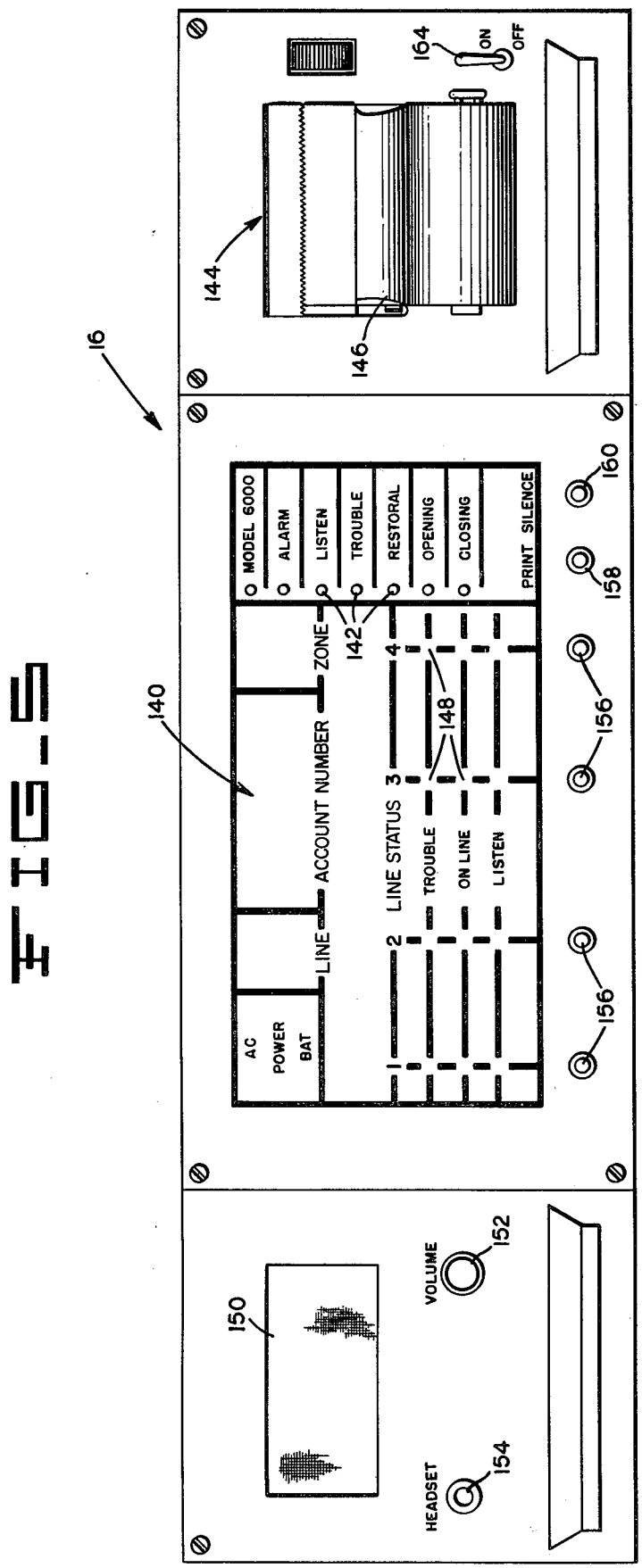

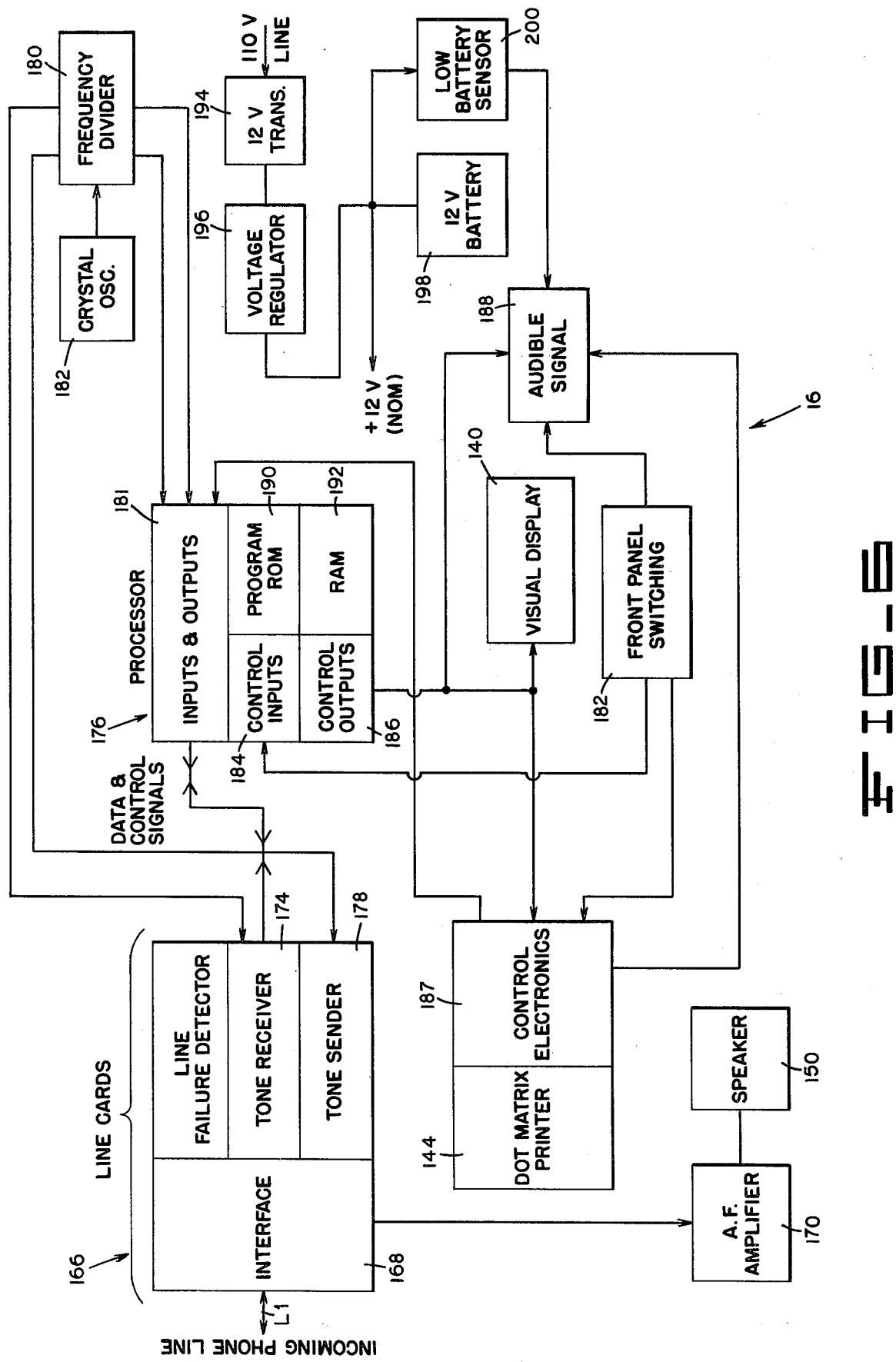

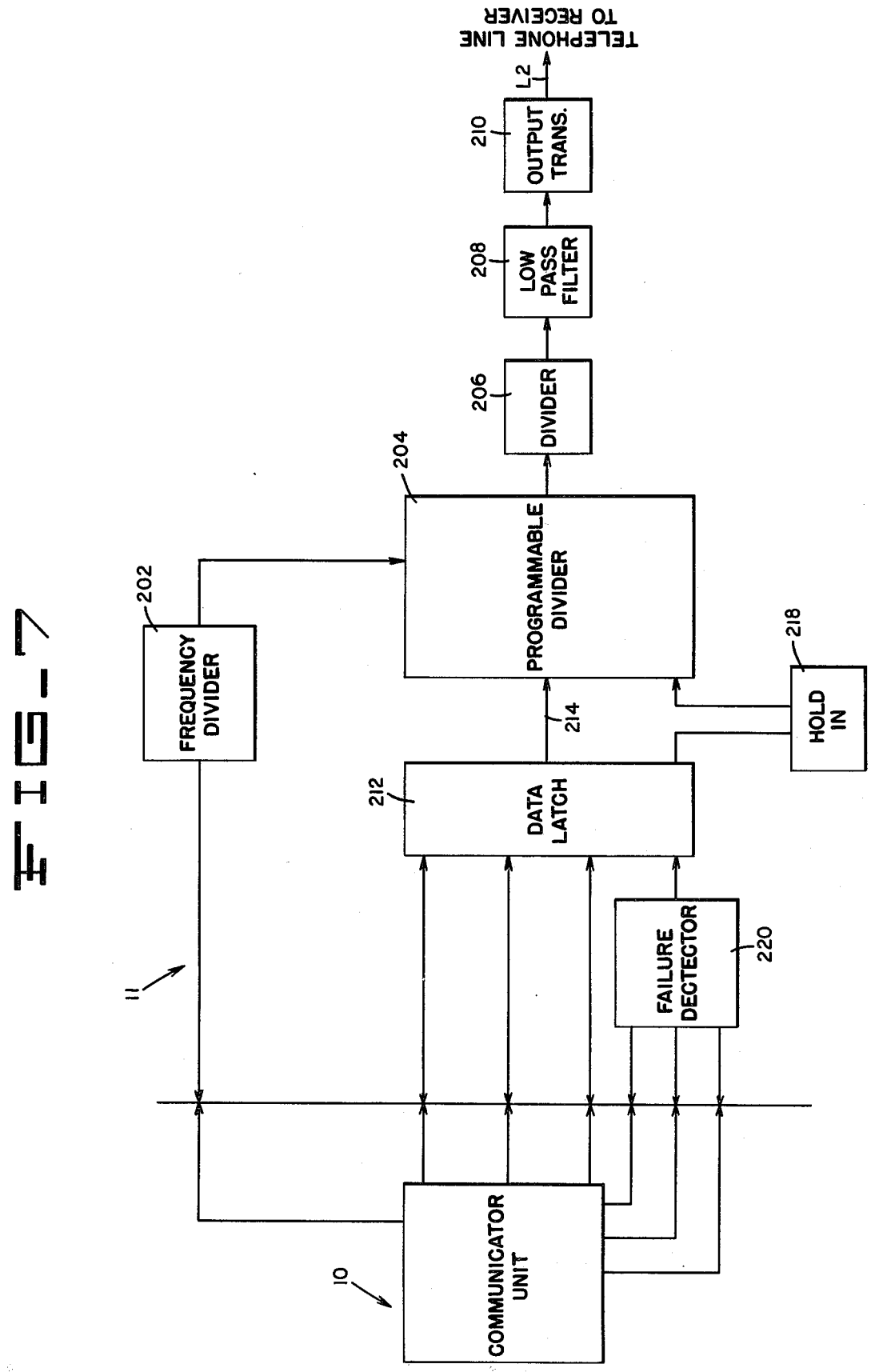

PROGRAMMABLE ALARM SYSTEM

This is a continuation of application Ser. No. 947,263 filed on Sept. 28, 1978 now abandoned.

FIELD OF THE INVENTION

The present invention relates generally to communication systems and more particularly to a programmable alarm system which includes a local communicator that can be installed in a residence, shop, office building, or on other premises to sense various problem situations (fire, burglary, panic or the like) and to transmit correlated digital information through existing dial-switched telephone lines or separate private lines to a central receiver station so that appropriate agencies (e.g. police, fire, hospital or the like) can be immediately informed of the type and location of the sensed problem.

BACKGROUND OF THE INVENTION

A rather large number of alarm systems are presently manufactured to provide protection against various problem situations which may be experienced in a residence, an office or shop building, or any other premises. Fire, burglary, panic, or any other unique situation can be sensed locally and the information then transmitted by a local communicator through appropriate connection to the local telephone lines for transmission to a receiver located at a suitable central location, so that the information can in turn be relayed to the appropriate agency (e.g. fire department, police department) or other desired recipient.

While all these systems are generally effective, there are certain problems, the most significant of which is the lack of flexibility of the units. For example, most existing communicators include "hard wiring" to meet the particular requirements of a given installation. This "customization" not only increases initial cost but also presents a problem if the protective circuits are to be changed or modified.

Typically again, a practical problem is encountered at the central receiving station because of the time involved in communication of a given alarm so that a limited number of local communicators can be connected to a single central receiver, thus further increasing not only initial cost but subsequent maintenance.

Furthermore, since the alarm reporting is dependent upon the integrity of the telephone line, if, for example, a burglar were to cut the telephone line prior to his entry, no information would thereafter be transmitted to the central location so that the entire security system would break down.

SUMMARY OF THE PRESENT INVENTION

Accordingly, it is the general objective of the present application to provide a programmable alarm system, including a digital communicator at each local station containing a memory which can be programmed by a detachable programmer unit to meet a wide variety of user requirements, and can moreover be modified at any time when such requirements change. While such a communicator is compatible through appropriate phone line connection to any one of a number of central station receivers, when conjoined with a particular receiver at the central station embodying the present invention, a more rapid rate of information delivery is provided. In the event that the integrity of the digital communicator-central station system is interrupted, in accordance with an additional objective of the invention, a separate, redundant transmission from a multiplexer transmitter associated with the digital communicator is established to a central receiver through a separate private line.

To achieve such objectives, the communicator unit can be readily connected to a plurality of alarm sensors, typical examples being a simple panic button, a fire sensor, a motion detector, window foils, door switches and the like. The sensed information from any of the sensors is processed by the communicator into digital format and then delivered through suitable connection to the local telephone line for transmission to a central receiver which generally provides for a temporary visual display of the received information, together with a printed output providing a permanent record of the information received.

In addition to reports of an alarm, the communicator unit is arranged to also report any trouble such as a sensor malfunction or discontinuity of sensor wiring, and a restoral report when such malfunction has been corrected, or the alarm condition returned to normal.

In accordance with a significant aspect of the present invention, the communicator unit is adapted for temporary connection to a programmer unit enabling the installer to quickly insert variable information into the memory portion of the communicator, such as, for example, the phone number to be dialed, the user account number, and the appropriate trouble and restoral reports, together with the character of the communicator operation related to activation of each particular alarm sensor. Once the memory portion of the communicator has been so programmed, the programmer unit can be removed and utilized for other installations, each of which can accordingly be customized in accordance with the needs and requirements of the particular user without any rewiring or other modification of the communicator unit itself.

Furthermore, as will be obvious, if any changes are to be made, the programmer can once again be connected to the communicator and the entire operational program can be changed, or the program of an individual sensor or other specific data can be modified as required.

Additionally, if any problems arise in the communicator, the programmer unit can be temporarily connected thereto with the capability of providing a test operation which will display the status of any selected data, thus allowing modification, if indeed an undesired situation appears. In particular, the status of each sensor, and more particularly its sensing loop circuit, can be immediately checked as to its condition of being normal, open or shorted, thus facilitating any necessary trouble shooting and/or repair.

In accordance with an additional important aspect of the present invention, the communicator unit, and more particularly the individual sensors, can be selectively activated or armed. For example, if a residence is occupied, perimeter zones such as doors and windows can be selectively armed while other internal zones (motion detectors or mats) within the residence can be inactive, thus precluding false reports resultant from the activities of the occupants of the residence.

While the communicator can be entirely armed (activated) or disarmed at a point interior or exterior to the premises, for example by a simple key switch, in accordance with another aspect of the invention, the communicator can be programmed to accept arming or disarming from a digital key-pad which can be placed at any convenient location and enables the arming or disarming to occur only when numerical digit keys with a combination of up to eight digits, known of course only to the owners or occupants of the residence or other establishment, are depressed or punched in appropriate sequence. This key-pad data can also be checked by the test function of the programmer.

While the programmed communicator can be arranged to transmit information to any of a number of existent central receivers, it is particularly useful when utilized in connection with a central receiver embodying the present invention. In the first place, when the communicator is programmed for use with such receiver, it automatically sends or transmits the information at more than twice the rate of other communicators, and also allows a five digit report wherein the first four digits provide the requisite information and the final digit provides parity information that is an automatic check on the proper transmission, thus obviating the necessity for a double or multiple transmission of a report, as is customary with most existent alarm systems.

As the information is received at the central receiver, it is displayed to indicate the line number, the particular account number, the reporting zone, and the nature of the transmission. In addition, the receiver incorporates a printer which automatically records in chronological sequence the reports received from all of the local communicators connected thereto, including the data, time, line number, account number, and the message by zone in an easy-to-read alpha-numeric printout. More particularly, it will distinguish between alarms, openings, closings, trouble and restoral reports. If the particular account communicator incorporated a local listen-in arrangement, the audio information will also be heard at the receiver.

An accessory unit is arranged for optional releasable connection to each communicator unit after the programmer unit has been disconnected through the same connection arrangement, and in accordance with the additional security objective of the invention, establishes connection and one-way transmission through a separate private line to a central multiplex receiver capable of receiving inputs from a number of communicator accessory units (e.g. 24 units). Normally, a unique frequency tone is transmitted, but if any alarm condition occurs the frequency changes, thus to indicate the existence of the "alarm" condition at the receiver. Furthermore, if a trouble condition occurs (e.g. telephone line break, communicator unit malfunction or the like), the normal frequency tone will not exist and its absense will be suitably indicated at the receiver. Thus, a redundant double-check and foolproof system is provided.

While this accessory unit was designed as a complementary unit to the digital communicator system, it will be immediately understood by those skilled in the art that the unit can be appropriately connected directly to alarm sensing units and thus used as an alarm system by itself.

BRIEF DESCRIPTION OF THE DRAWINGS

The stated objective of the invention and the manner in which it is achieved as summarized hereinabove can be more readily understood by reference to the following detailed description of the exemplary system shown in the accompanying drawings wherein:

FIG. 1 is a general block diagrammatic showing of the programmable alarm system embodying the present invention, FIG. 2 is a side elevational view of the local digital communicator unit, FIG. 3 is a similar side elevational view of a programmer unit adapted for temporary connection to the communicator unit when the latter is to be programmed, FIGS. 4A and 4B jointly show an electrical block diagram of the digital communicator unit shown in its electrical association with the programmer unit, FIG. 5 is an elevational view of a central receiver unit, FIG. 6 is an electrical block diagram of such central receiver, FIG. 7 is an electrical block diagram of a multiplex transmitter adapted for connection to the digital communicator unit.

DETAILED DESCRIPTION OF THE EXEMPLARY EMBODIMENT OF THE INVENTION

Figure 4B:
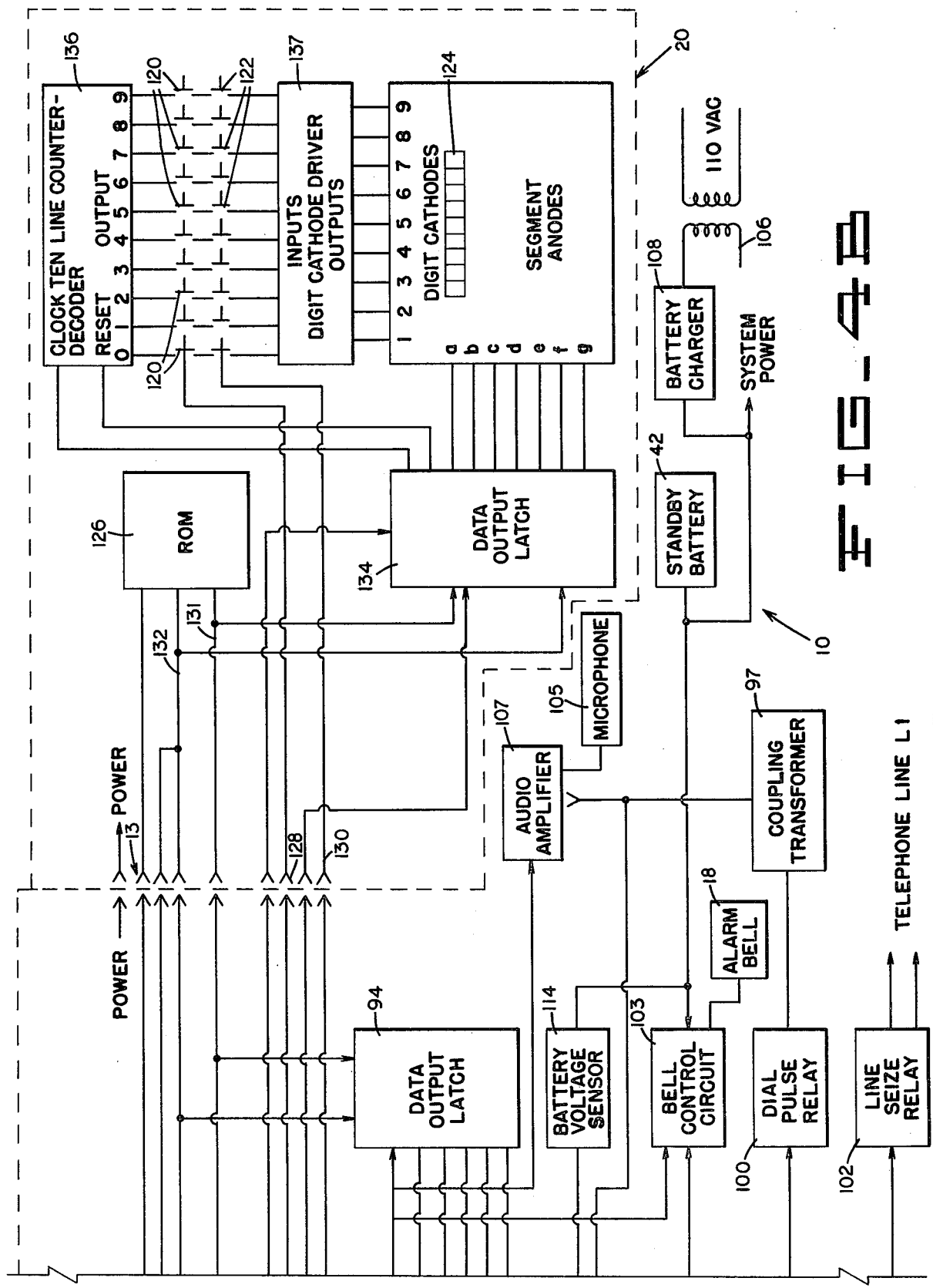

With initial reference to FIG. 1, the programmable alarm system, as generally illustrated, includes a communicator unit 10 which can be physically installed at any convenient location within a residence, office, shop building, or any other premises that are to be protected. A plurality of sensor inputs 12 are connected to the communicator 10 to initiate various alarm reports such as fire, burglary, panic, motion detection or the like, and to also provide trouble and restoral inputs indicating a malfunction and its correction.

A control key-pad unit 14 which can be located interiorly or exteriorly of the premises includes a plurality of digit keys which can be programmed to provide a sequential combination for arming (activating) or disarming the communicator unit with appropriate time delays for entry or exit from the premises by its normal occupants without instigating an alarm.

When activated, the communicator unit 10 will convert the sensed data into a digital format for transmission through appropriate connection to a local telephone line L1, which can also be connected to a telephone T at the premises, for ultimate delivery to a central receiver 16, whereat the place and character of the reported alarm is displayed both on a temporary visual display and a permanent printed record, as will be described in more detail hereinafter. Also, any alarm signal can be utilized to activate a bell or other local audio or visual indicator 18, if desired and so programmed.

In the event that the telephone line is cut or the communicator unit 10 itself malfunctions, additional security can be provided by a separate and economical multiplex system which includes a multiplex transmitter 11 that can be easily connected to the communicator unit 10 by a suitable plug-in arrangement indicated at 13 in FIG. 1. The transmitter 11 delivers a predetermined frequency tone through a separate private line L2 to a multiplex receiver 15 under normal conditions, but the frequency will change if an alarm condition occurs and the normal tone will cease if the communicator unit 10, in some fashion, is disabled. Thus, a separate, redundant indication of the general security situation at the local premises is provided.

The communicator unit 10 includes a memory which can be programmed by a programmer unit 20, which preferably is one that can be temporarily connected to the communicator unit 10 at the plug-in arrangement 13, to control the precise nature of the outputs to the central receiver 16 and can thereafter be disconnected from the communicator unit 10 so that the same will thereafter function in accordance with the programmed data. At any time, the programmer unit 20 can be reconnected if any changes or modifications in the reported information and its character are desired, and it will also be noted that the same programmer unit 20 can also be utilized to program any other communicator units 10 of the same type, thus reducing the installation or modification equipment requirement to a very large degree while at the same time providing for full flexibility of the local alarm reporting characteristics.

Physically, the communicator unit 10, as shown in FIG. 2, can constitute a rather small housing 30, no more than one foot square and three inches in depth. It can be mounted on a wall or any other similar location where convenient, and preferably is closed at the front by a pivoted door 32 with a key lock 34, so that no tampering with the unit is possible without key access. The electronic circuitry is mounted within the housing 30 behind a face plate 36 provided with appropriate indicia for simplifying the appropriate connections to the communicator unit 10. More particularly, two terminals 38, 40 are provided at the lower left for connection with a small standby battery 42 in the event of power failure, power in the form of a 12-VAC input being normally supplied through connecting screw-terminals 44, 46 at the upper left of the unit. Also at the upper left are additional screw-terminals 48, 50, 52 for providing an auxiliary power output or 6 VDC for a local bell connection. Below these screw-terminals are several terminals 54 for connection to a standard telephone jack 55, enabling the output of the communicator 10 to be established with the telephone line L1. Across the bottom of the unit are twelve screw-terminals 56 for appropriate connection of the input sensors in the form of circuit loops, as diagrammatically indicated on the face plate and as will be described hereinafter, and on the right of the unit are a number of screw-terminals 58, as indicated on the face plate, for connection of control units as the digital key-pad previously mentioned and other arming or activating connections.

While not shown in FIG. 2, a plurality of connecting sockets are provided at the top of the communicator unit 10, enabling the mentioned plug-in connection 13 of the programmer unit 20, illustrated in FIGS. 3 and 4, and the separate multiplex transmitter 11 shown in FIG. 7.

The electrical circuits of both the communicator unit 10 and the programmer unit 20 which can be temporarily connected thereto are shown in the block diagram of FIGS. 4A and 4B. More particularly, the communicator unit 10 is connected by the previously described screw-terminals 56 to one or more particular sensors. As shown in FIG. 4A specifically, one connection is made to a fire sensor 62 which takes the form of a loop circuit that can be shorted by any standard fire detection unit such as a thermostat, an ionization detector, or any other available sensing mechanism, to instigate an alarm report. More particularly, as shown, the loop circuit of the fire sensor 62 is terminated by a 1,000 ohm resistor 64, and is electrically arranged to report a short if the total resistance across the loop is less than 500 ohms, or to indicate an "open" circuit if a resistance higher than 1,500 ohms exists. The second sensor 66 illustrated is a "panic" sensor in the form of another resistance-terminated loop circuit with two buttons 68 located at various desired positions within a residence, enabling the occupant to manually instigate an alarm whenever it is desired by the mere pushing of any button 68. A third sensor loop circuit 70 provides a perimeter intrusion sensor such as a window foil 72, and a fourth sensor 76 provides an interior intrusion sensor which could be, for example, in the form of an electrified floor mat 78.

All of the sensors are connected to multiple protective networks 80 which electrically take the form of resistance-capacity circuits (time constants) which will suppress transients on the inputs from the sensors to preclude false alarms. Master (full) or partial arming or activating of the communicator from a key switch 81 or the like at some internal or external perimeter location and connected to the protective networks 80 by two of the terminals 58 provides additional control signals. The arming signals are connected though an indicator driver 83 which constitutes a current-limited switch to a control processing unit 86 and to arming status indicators 85 in the form of light-emitting diodes on the panel. All of these input signals are delivered to an analog multiplexer 82 which routes any one of the input signals to a comparator 84. More particularly, the signals delivered to the analog multiplexer 82 include the voltage on each of the multiple sensor loops, the voltage on the master arming input or on the perimeter arming input, the battery voltage status, audio input, and forced arming input. The comparator 84 sets thresholds or limits, both high and low, on the output of the analog multiplexer 82 and delivers its signal outputs, uniquely correlated with the various input signals, to the control processing unit 86, which controls delivery of data from memory units 88, 90, 92 in a manner to be described hereinafter, to a data output latch 94 (FIG. 4B). The memory units include a read-only memory 88 containing program instructions in integrated circuits allowing the unit to provide the general alarm operation, a random access memory 90 which provides temporary storage for data generated by the control processor, and a variable random access memory 92 which stores variable program parameters introduced from the programmer unit 20 including:

1. Frequency and timing table addresses for parameters to be used in communicating with various central station receivers.
2. Phone number to be dialed.
3. Subscriber account number.
4. Digits to be sent on the occasion of: trouble, restoral, opening, closing.
5. Time delays for entry and exit.
6. Entry delay prewarning enable.
7. Bell cutoff time. Bell test enable.
8. Listen in timer.
9. Miscellaneous options: Arming light blink, Phone callout try limit, Battery report suppression, Trouble and restoral report expansion, Fault list with closing report.
10. Combination for digital key-pad arm/disarm.
11. Delays for the key-pad entry and penalty.
12. Sensor loop operation codes.

In the event of power failure, a back-up battery 96 preserves the programmed data in this memory unit 92.

The information from the data output latch 94 is delivered to a plurality of current amplifiers 98 which constitute transistor relay drivers which supply the current necessary to activate various relays, such as a dial pulse relay 100, which, under control of the processor 86, opens or closes a dial telephone line in a manner simulating the dialing of a telephone. The current amplifiers 98, under control of the processor 86, also activate a line seize relay 102 which isolates the telephone L1 on a protected premise while a report is being made, and a bell control circuit 103 for the mentioned alarm bell 18. Audio signals, including an input from a local microphone 105, are delivered through an audio amplifier 107 and a coupling transformer 97 to the phone line L1, and data are delivered by the data latch 94 through a transmit amplifier shaper 95 which suppresses harmonics to the coupling transformer 97. Input audio signals from the telephone line L1 such as the dial tone are, in turn, delivered by the transformer 97 to a receive audio amplifier 99 which receives and amplifies audio signals for delivery to the analog multiplexer 82, and ultimately to the processor unit 86.

The control processing unit 86 also is provided with an input from a clock crystal 104 which constitutes an oscillator that essentially determines the timing and frequency functions of the entire communicator; for example, the timing of any entry delay, exit delay, bell cutoff, phone dialing make and break, etc., as well as the message transmission tone (frequency) and frequency discrimination enabling detection of the dial tone and acknowledge tone, as will be explained in more detail hereinafter.

The entire communicator unit is energized by 12 VAC which is delivered from a transformer 106 connected to a standard 110-VAC source through a battery charger 108 which constitutes a current-limited voltage regulator, which provides the power for normal system operation and also is connected to the mentioned standby battery 42 to provide power to operate the system whenever a temporary power outage occurs.

If, for any reason, the system supply voltage drops below the minimum necessary for proper operation, a low voltage cutoff sensor 112 is activated to disable the data output latch 94, the variable random access memory 92, and also the bell control circuit 103. This bell control circuit 103 is normally arranged to inhibit bell operation if the initiating signal occurs within about 30 seconds of a power-on reset, and such inhibition continues until the bell initiating signal from the processor has been removed for about 30 seconds. This prevents a defective battery which will not support bell operation from disabling the operation of the entire communicator. A battery voltage sensor 114 is also connected to determine the system voltage and delivers such sensed information to the analog multiplexer 82, and ultimately to the control processing unit 86. The data output latch 94 also delivers processed data to an amplifier 116 which supplies current to an indicator buzzer 118 on the circuit board of the communicator unit and any other externally located indicators, for example, on the keypad control unit 14, its output being current limited to preclude damage by any short circuits.

In order to program the communicator unit 10, and more particularly the variable random access memory unit 92 therein, the mentioned programmer unit 20 as physically shown in FIG. 3 is detachably connected by the mentioned plug-in arrangement 13 to the communicator unit 10 to establish the electrical connections as diagrammatically illustrated in FIG. 4B. The front of the programmer unit 20 mounts a plurality of data entry keys or buttons, including 15 keys 120 designated by the single digit numerals 0-9 and letters b, C, d, E and F, and five control keys 122, arranged upon sequential depression to close various circuits, whose functions will be explained in detail hereinafter, and the data so entered is displayed in a nine-digit visual display window 124 located immediately thereabove. The face of the programmer unit also is provided with printed indicia indicating briefly the character of the data which should be entered during programming operation so as to remind the installer of the necessary sequence in the programming steps.

Basically, for each sequential entry, appropriate control and digit keys 120, 122 are designated so that the data related to a program code pre-established in a read-only memory unit 126 is delivered through interconnections 128, 130 with the alarm unit to the control processing unit 86 therein, which enables introduction of the programmed data to be stored into the variable random access memory unit 92 in the alarm system itself. The control data is delivered through additional connections 131, 132 between the programmer and communicator units to a data output latch 134 which energizes a standard seven-segment display for each digit in the nine-digit display window 124. The digits are sequentially illuminated by a counter decoder 136 which controls a digit cathode driver 137. Each time an output instruction is issued to the output data latch 134, the counter decoder 136 is incremented. The counter is reset by the last (seventh) output line of the processor. Additionally, the outputs of the counter decoder 136 apply a voltage to one side of each key switch 120, 122. When a key is depressed, this voltage is applied to control a sense input of the processor 86.

The control keys 122, as indicated on the front of the programmer unit 20, have the following functions:

SEL (Select)
  Depression of this key will display "SELEC" in the window. A number or letter key may now be pressed on the digital keyboard which will display the corresponding line of information. For example, pressing the "SEL" key and then the "3" will effect display of the selected phone number. When the programmer unit 20 is first connected to the communicator unit 10, "SELEC" should appear.

TST (Test)
  Depression of this key displays the loop status of the individual sensed zone or area. If normal, a "-" will appear; if open, an "O", and if shorted, an "S".

CLR (Clear)
  Depression of this key clears all data from a line and must be pressed before reprogramming that line. When "CLR" and "SEL" are pressed at the same time, the entire program will be erased in the random access memory unit 92.

ENT (Enter)
  Depression of this key will display the next line of data, and a flashing cursor will indicate where further key input data will be entered.

→ (Advance)
  Depression of this key advances the cursor across the particular line.

While the keys G, d, b, E and F supplement the digit keys numbered 0-9 so that a selection of 15 digit keys is enabled, these lettered keys also allow the introduction of certain specific data as follows:

C (pause)
  This key may be depressed at any position to provide for a three-second pause. For example, it may be depressed when a noisy telephone line exists and would otherwise cause premature dialing.

d (dial tone wait)
This key may be depressed at any position to provide for a second dial tone wait. For example, nine-d-two-one-two (9d212) dials a nine, waits for a dial tone, then dials area code 212.

b (bell cutoff time)
Anywhere from two to ninety-nine minutes can be entered by pressing the appropriate digits. This key can be used also to provide for a bell test. If a small "b" is entered and a momentary arming station is held in the activated position for three seconds, the bell will ring until the switch is released.

E (pre-warning-expanded report)
This key constitutes a pre-warning enable switch which activates the buzzer during any entry delayed time, thus to function as a reminder to the occupant to disarm the system, and also provides, after a trouble or restoral report, designation of the zone.

F (fault)
The fault key will cause an inventory of all faulted zones to be transmitted with a closing report.

A typical residential program would be programmed as follows, utilizing the fire, panic, exterior and interior intrusion loops as indicated diagrammatically in FIG. 4A. The identifying letters shown in parentheses will appear upon sequential depression of the "ENT" key and the other data then entered by selective key depression.

depressed, which erases all of the old information previously in the unit and displays "SELEC" on the visual display. The ENT button is then depressed, which will open the system for the display on line one and enter CS on the display. If the receiver embodying the present invention is used, the numeral keys 5 and 5 are pushed to automatically set up a system for the superspeed transmission permitted by this receiver. More particularly, the initial "5" entry establishes the pulse frequency requisite for the receiver of the present invention, which is twice that of other systems, and the second "5" entry sets the five-digit transmission format wherein the first four digits provide the information and the fifth digit provides the parity check, obviating the necessity for repeat transmission and thus reducing transmission time. Briefly, a transmission rate better than four times other systems is enabled.

The operation of the fifth parity digit briefly is as follows. Each of the first four digits requires between one and fifteen pulses. The fifth digit is programmed so that the sum of all five is a multiple of fifteen, and if such fifteen multiple is delivered to the receiver, it automatically acknowledges a correct receipt of information, signalling to the communicator unit 10 that no further transmission is required. Otherwise, a repeat message will be transmitted.

After this has been entered, the phone prefix entry is entered by first depressing the entry "ENT" key to display the "P", then the numeral "1", followed by depressing the "C" key to provide a three-second pause, and then depressing the digit keys in turn, 800, which

| LINE | DISPLAY | MEANING |
|---|---|---|
| 1 | (CS) 55 | Set up for one round superspeed transmission in accordance with the present invention |
| 2 | (P) 1C800 | Dial 1; pause 3 seconds; dial 800. |
| 3 | (Ph)6367285 | Dial 6367285; the central station number. |
| 4 | (ACC) 123 | Account number 123. |
| 5 | (t)F (r)E E | Send code F (15 pulses) for a trouble report; send code E (14 pulses); use the expanded reporting format to specify which zone has troubled or restored. Send no opening or closing reports. |
| 6 | (OP) (CL) | No opening or closing reports are transmitted. |
| 7 | (di)40 (do)20 | Give an entry delay of 40 seconds; give an exit delay of 20 seconds. |
| 8 | (PrE) E | Sound the pre-warning during the entry delay. |
| 9 | (bELL) 10 | Turn the bell off after 10 minutes of ringing. |
| 0 | (LIS) | No entry; no listening device in use. |
| b | (A) (P) (L) | No entries on this line unless a limit of eight tries on a callout is desired. Enter 8 after the P. |
| C | (C)E05 dL | The combination must be entered in five seconds. |
|   | (LOOP 1)314 | A fire loop to be used in conjuction with the fire module for approval. Gives a zone 1 alarm with pulsed bell any time the loop is shorted. Gives a zone 1 trouble report any time the loop opens or either side is grounded. The buzzer will sound as long as the loop is in either the trouble or alarm state. No restoral reports are generated. |
|   | (LOOP 2)311 | A panic button loop. Shorting the loop with a panic button gives an instant silent alarm. An open in the loop gives a trouble report. |
|   | (LOOP 3)583 | A perimeter intrusion loop. Armed by either the key-pad, MA terminal or the PA terminal. Gives an entry delay on an open or short. Sends an alarm and gives a steady bell ring after the entry delay if the user does not disarm the system. Buzzer sounds during the entry delay. Exit delay on master arm; no exit delay on perimeter arm. |
|   | (LOOP 4)513 | An interior intrusion loop. Armed only by the key-pad or MA terminal. Exit delay on arming; no entry delay. Instant alarm on open or short when armed. Bell rings on alarm. |

By way of explanation, before the new program is to be entered, momentarily the SEL and CLR buttons are constitutes the area code desired. The "ENT" key is again depressed, which allows line 3 to be entered, which in this residential program constitutes the phone number of the central station and includes a sequential depression of the following digit keys: 636 7285.

The "ENT" button is again depressed and the account number can be entered by sequential depression of the digits 1, 2 and 3. In certain cases, instead of numerical digits for the account number (e.g. 1, 2, 3) the first digit can constitute one of the letters b, C, d, E or F, in which case the particular subscriber can utilize the mentioned microphone 105 and the central receiver can incorporate a "listen-in" feature. It is to be particularly noted that since 15 keys can be utilized in three digit combinations, a theoretical limit of $15^3$ or 3,375 accounts can be accommodated.

After a successive depression of the "ENT" key, the key "F" can be depressed for a trouble report, key "E" for a restoral report, and "E" again for an expanded report. The "ENT" key is again depressed, but because no opening or closing reports are required, no additional digits need be depressed. If, for example, such reports were required, key "b" could be depressed as an opening report and key "C" for a closing report, and if required, the "F" key can be depressed to indicate that all faulted zones would be reported at the closing. The "ENT" key is again depressed, and after a delay of 40 seconds and an exit delay of 20 seconds similarly entered by depression of the numerical keys.

Thereafter, again, depression of the "ENT" key prewarn entry can be achieved by depressing the "E" key, and in turn by depression of the "ENT" and "b" keys and a double digit entry from 2 to 99 minutes can be entered, and in the present case has been entered as 10 minutes of ringing.

After repeated depression of the "ENT" key, a listening time between two and nine minutes, if used, can be entered. No entries are usually made on the subsequent line unless a limit of eight tries on a callout is desired, in which case "8" would be entered.

The next entry line enables the particular key-pad combination up to eight digits to be entered, and on the following line the time allowed for the combination to be entered, and the permitted delay after a wrong digit (e.g. 5 seconds).

When the "ENT" key is again depressed, the programming of the sensors (or sensing loops) can be instigated, and in accordance with a particularly advantageous aspect of the present invention, a three-digit code can be set up for each sensor. In the fire sensor (Loop I), the "3" key indicates that any opening in the fire circuit loop indicates trouble, the master arming or second digit is established by depressing the "1" key which provides for an instant alarm, and the numeral "4" key subsequently depressed provides for a pulsed bell.

In turn, depression of the "ENT" key allows Loop 2 to be programmed. In this case, it is a panic button loop and depression of the "3" key provides for a trouble report if the circuit has been opened, the "1" key depression provides a short in the loop which provides an instant alarm, which, however, in accordance with the depression of the third digit, as the "1" key, provides for a silent alarm. Similarly, the Loop 3 and Loop 4 are programmed and the system is then ready for operation. It is to be particularly noted that the operation and character of each loop sensor can be reprogrammed whenever desired so that great flexibility in the loop programming is enabled for all installations.

Any output signals from the digital communicator 10 are delivered through the phone line L1 to the central receiver 16 whose physical appearance is substantially as shown in FIG. 5, providing certain display and control functions. More particularly, a visual display 140 at the top of the unit presents information as to the line number, the account number, and the particular zone to the operator. Four incoming lines can be processed simultaneously. At the right of the receiver are a plurality of light-emitting diodes 142, indicating whether the incoming signal constitutes an alarm, listen, trouble, restoral, opening, or closing report. The received information is permanently applied to an associated printer 144 that supplies a tape 146 which records the date, time, the line, the account, the nature of the report, and its zone location. Thus a permanent and easy-to-read record is provided. By way of example, sequential entries as listed may appear on the tape:

| 81/18 | 13:85 | L1 ACCT 739 | ALARM | ZONE 8 |
|---|---|---|---|---|
| 81/18 | 13:84 | L1 ACCT 739 | TROUBLE | ZONE 9 |
| 81/18 | 13:84 | L1 ACCT 739 | TROUBLE REPORT | |
| 81/18 | 12:56 | L1 ACCT 739 | RESTORAL | ZONE 2 |
| 81/18 | 12:56 | L1 ACCT 739 | RESTORAL REPORT | |
| 81/18 | 12:55 | L1 ACCT 739 | OPENING REPORT | |
| 81/18 | 12:54 | L1 ACCT 739 | RESTORAL | ZONE 5 |
| 81/18 | 12:54 | ACCT 739 | RESTORAL REPORT | |
| 81/18 | 12:51 | L1 ACCT 195 | ALARM | ZONE 1 |

Centrally on the front panel of the receiver are a plurality of light-emitting diodes 148 in a row-column arrangement indicative of the status of the four incoming lines. More particularly, the diodes indicate for each line whether it has a trouble, on-line or listen-in status. The line trouble diode will be activated if the phone line continuity is lost, and will energize the printer, print out the line trouble and line number. Each on-line diode will flash when a call is being received, and the diode thereunder will indicate which line is connected to the receiver speaker 150, located physically to the left of the receiver.

A volume control 152 for the speaker 150 is located therebelow, as well as a jack 154, allowing connection of an external headset. If one of the previously mentioned listen-in subscriber communicator units 10 is transmitting, the audio output will be heard.

Additionally, below each of the line indicators, a push button 156 exists, and if depressed will transfer the call to the speaker 150, or if the line is inactive, depression of one button 156 will activate that line, bringing up the dial tone from the exchange and routing it to the speaker 150.

A manual "Print" button or key 158 on the receiver 16 can be depressed to test the printer 144 by printing the date and time. In turn, a "Silence" button 160 silences a buzzer 162 (not shown) which is activated when a report is received, and if depressed a second time, the "Silence" button will bring forth any additional received information or clear the visual display and permit the processing of other incoming information.

If paper in the printer needs replacement, an ON-OFF switch 164 can be temporarily moved to its "OFF" position to allow such replacement.

Electrically, the unit is arranged as shown in block diagram in FIG. 6. The receiver 16 is capable of receiving up to four different line cards 166, each of which includes an electronic interface port indicated at 168 through which communication is established between the communicator 10 and the appropriate elements of the central receiver. More particularly, each line card 166 is arranged to direct the appropriate incoming audio signals to an audio frequency amplifier 170, which in turn delivers the audio message to the described speaker 150. While providing isolation of the adjacent circuitry from the incoming telephone line L1, the line cards 166 are arranged electrically to direct the incoming signals to a tone receiver 174 which amplifies, filters, and digitally detects those signals received from the communicator unit and converts those tone bursts to binary signals for delivery to a processor unit generally indicated at 176. Each line card 166 also includes a tone sender 178 which accepts a continuous square wave signal from a frequency divider 180 connected to a crystal oscillator 182 for gated delivery to the phone line L1 and ultimately to the communicator unit 10 under control of the processor 176. Low pass filtering is incorporated in the tone sender 178 to modify the square wave signal into an approximation of a sine wave output signal. The processor unit includes an input and output section 181 which receives information from and supplies control signals to each of the line cards 166. Each of the line cards 166 communicates the following input information at appropriate times: ring down, presence of the incoming tone burst, failure of the incoming central office battery; and each line card, in turn, receives and transmits an off hook signal, a tone burst for delivery to the communicator unit 10, and a listen state which connects the incoming audio signals to the previously described amplifier 170 and the speaker 150. The previously described front panel switches, generally indicated at 182 in FIG. 6, are connected to a control input section 184 of the processor to set the clock and calendar, select fully automatic printing or manual operation, provide for test printing, audible signal silence in the particular operating mode, as previously mentioned. It also contains an output control section 186 that delivers incoming signals both to the visual display 140 and also to a control electronics unit 187, arranged to energize the printer 144 for printing the received information. The output of the control section 186 also activates an audible signal unit 188 when a print request has been issued or the visual display unit 140 has been active for 20 seconds.

The processor also contains a read-only memory section 190 which contains the general program and a random access memory section 192 which stores incoming information for display and printing, clock and calendar, and provides subroutine stack for storage of information generated by the processor.

The central receiver is generally powered from a 110 volt AC line which is connected to a 12 volt transformer 194 and a voltage regulator 196 to supply suitable DC voltage for powering of the unit. A standby battery 198 is connected into the system to supply temporary power therefor in the event of line failure, and a low battery sensor 200 will energize the audible signal 188 if the battery voltage approaches a critical low level.

The described crystal oscillator 182 also, through the frequency divider 180, is arranged to deliver eight millisecond pulses to the processor unit for timing the received tone bursts, and also supplies one-second pulses for the clock calendar functions.

In summary, the central receiver enables visual display as well as a permanent record of any alarm, trouble, restoral, opening or closing reports from a number of the local communicator units in a rapid and effective fashion so that appropriate corrective action can be taken.

As previously mentioned, while the type of communication using existing dial telephone circuits is extremely economical, in the event that a telephone line is cut, it would be impossible to transmit the information to the central receiving station, and as a consequence, in accordance with an additional aspect of the present invention, the mentioned separate multiplex transmitter 11 is arranged for connection to the digital communicator 10 so that information can be transmitted through a separate private line L2 running to the separate receiver 15 so as to indicate not only the report of an alarm condition but an immediate indication that a trouble situation exists, such as a break in the connecting line due to a phone company problem, equipment trouble, or a line compromise attempt. More particularly, the local multiplex transmitter 11, as shown in FIG. 7, is arranged for plug-in connection to the previously described digital communicator 10 after the programming unit 20 has been removed from such connection, and essentially is arranged to provide for generation of a normal supervisory tone at a particular frequency when normal operation exists. In the event that the supervisory tone is missing, the operator at a central receiving station to be described hereinafter will know there has been a break in this line. On the other hand, when an alarm condition exists, the frequency or tone will change to a new and unique frequency for that particular subscriber, and at the receiving end the change in tone will alert the operator that there is indeed an alarm condition present.

With particular reference to FIG. 7, when this accessory multiplex transmitter 11 is connected to the communicator unit 10, a predetermined frequency (e.g. 2.09 MHz clock frequency) is delivered to the connected transmitter 11 and is first divided by a fixed factor of four by a conventional frequency divider 202. This divided frequency is further divided by a programmed binary-coded decimal divider 204 in a fashion to be described hereinafter, in a range that varies from a division factor of 51 to a division factor 99. After such frequency division, a further division by a factor of four at a fixed divider 206 of the frequency routes the signal through a low pass filter 208 and then through an output transformer 210 to the private line L2 previously mentioned.

Under normal conditions, the division factor of 51 produces a 2570 Hz tone which is the normal supervisory tone for the lowest number to count, and will indicate that normal operation of that communicator unit exists.

Generally, if an alarm condition occurs at the local residence or other installation point, the unit is arranged to change the division factor in the programmed divider 204 to 52, thus decreasing the frequency which will change the frequency received at a central location and indicate the alarm condition, again as will be explained in detail hereinafter.

To control the frequency division in the programmable divider 204, input data from the communicator unit 10 is delivered to a data latch 212 providing eight lines 214 which differentiate between the alarm and normal condition. One line 214 is routed through a hold-in circuit 218 that causes the frequency shift to persist for a certain amount of time (e.g. one minute) to assure that the alarm signal is detected by the receiver.

A failure detector 220 is also connected between the communicator unit 10 and the data latch 212 so as to apply a reset signal to the data latch 212, driving its output lines to all zero condition, resulting in no output signal, and the failure detector is arranged to produce this reset signal if either of two conditions occurs: (1) if a reset signal from the communicator unit comes into the failure detector, or (2) if the multiplex address line remains stable in any state for over one second. At the receiving end, this would be interpreted as a failure of the communicator unit 10 and, in effect, reports a trouble signal to the multiplex receiver 15.

It may be mentioned that the multiplex transmitter 11 draws its power connections from the main communicator unit 10 so as to require no separate power source.

Figure 8:
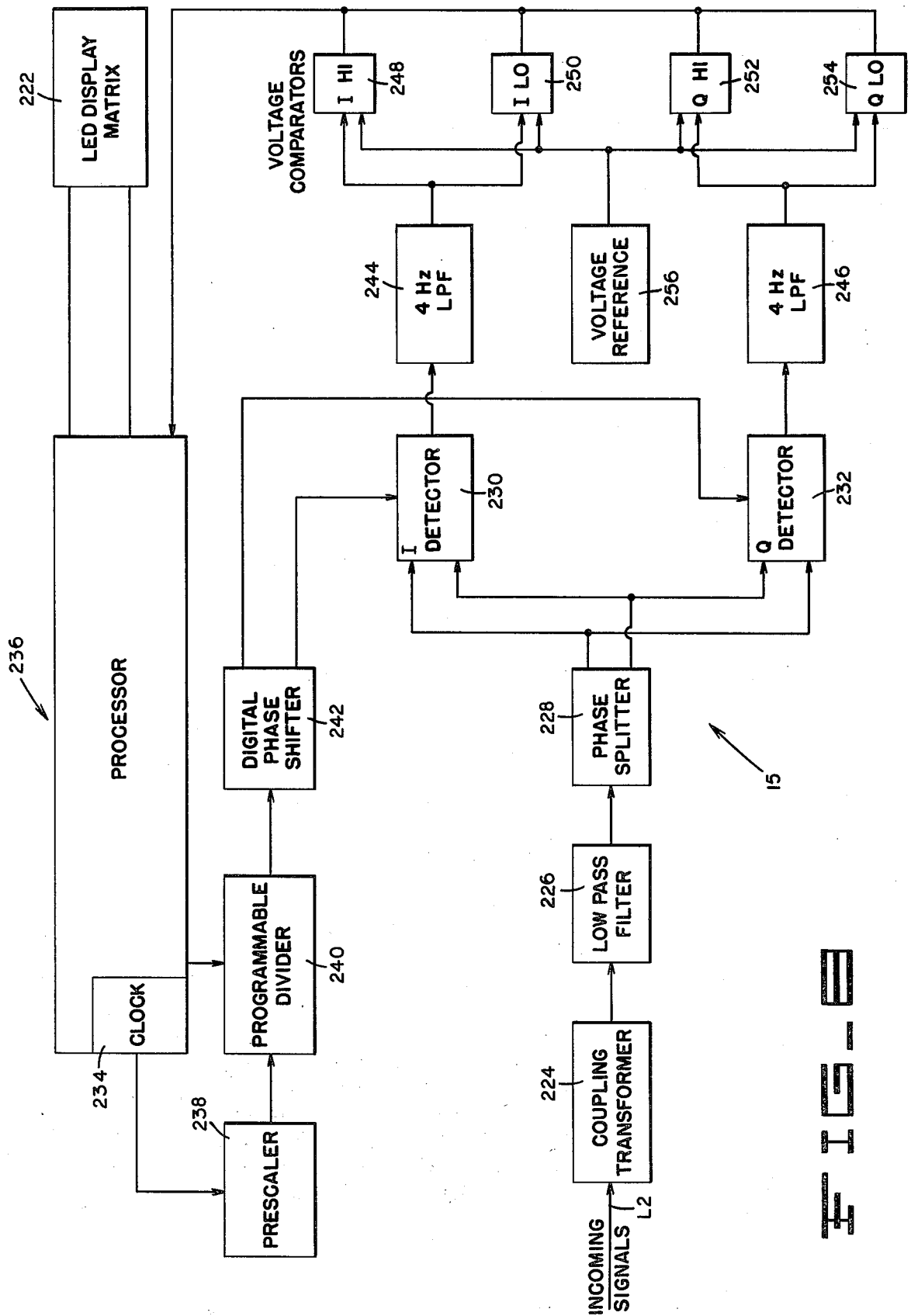
FIG. 8 is an electrical block diagram of the receiver unit associated with the multiplex transmitter of FIG. 7.

The multiplex receiver 15 which is illustrated in block diagram in FIG. 8 is arranged to receive signals from up to 24 different transmitters 11 of the type just described, and to produce a display on a light matrix display unit 222 which represents the information carried by the input signals. More particularly, the display unit 222 includes, in this instance, 24 light emitting diodes arranged in three rows and eight columns, which will indicate the status of any of the particular transmitters providing input signals to this multiplex receiver.

Incoming signals from all receivers are delivered to a coupling transformer 224 that provides high voltage isolation and lateral balance from the incoming telephone line, and delivers each signal to a low pass filter 226 at 2600 Hz to filter out any high frequency noise or signal harmonics which could interfere with proper signal detection. Each signal from the filter 226 is delivered to a phase-splitter 228 which provides two equal and opposite outputs (180° out of phase) for delivery to detectors 230, 232 connected in parallel for combination with two local oscillator signals to provide, in a conventional fashion, outputs consisting of the sum and difference products between the frequency of the local oscillators and the incoming signals.

The local oscillator signal is derived from a 2.09 MHz clock 234 forming part of a signal processor 236. This signal is first divided by four in a pre-scaler 238 and then is further divided by a factor between 51 and 99 in a programmable divider 240. This division factor is determined by the processor 236 to allow it to "tune in" on different frequencies in the composite received signal. In other words, the processor 236 programs the divider 240 so that it scans the entire frequency band of the 24 incoming signals. The local oscillator signal is next further divided by four in a digital phase shifter 242 in such a manner as to produce two outputs 90 degrees apart in phase (in quadrature). One output goes to each detector 230, 232.

The two detector outputs are delivered to low pass filters 244, 246 with a cutoff frequency of 4 Hz, and provide an output which, if zero at one of the channels, would be maximum at the other, so that the incoming signals would be detected regardless of any incoming phase relationship. Signals from these low pass filters 244, 246 are delivered to voltage comparators 248, 250, 252, 254 which compare the output voltage with that from a standard voltage reference 256. Ultimately, if no incoming signal is present which is within 4 Hz of the local oscillator signals, the outputs of both the in phase and quadrature low pass filters 244, 246 will average to zero and none of the voltage comparators will produce a voltage presence output. If, however, an incoming signal lies within plus or minus 4 Hz of the local oscillator signals, this difference frequency component will pass through the low pass filters and one of the voltage comparators will produce a presence output so as to be delivered to the processor 236 and ultimately displayed by the light emitting diode representative of the particular channel signal.

As has been previously indicated, the redundant accessory system just described is of particular value to indicate an interference with the integrity of the main system, and can be particularly useful in combination therewith. However, it is to be understood, as previously mentioned, that it can be used separately as an indicator of conditions resultant from certain alarm trouble or system restoral operations, and moreover can be utilized with the central station receiver previously described and utilized with the communicator unit itself.

The communicator unit 10 can, of course, be used with other central receivers with appropriate programming, and thus can be added to existing systems as a replacement for the local alarm unit to achieve its inherent advantages.

These and other variations and/or alterations as described can be envisioned within the general spirit of the invention, and accordingly the foregoing description of one system and accessories thereto is to be considered as purely exemplary and not in a limiting sense, and the actual scope of the invention is to be indicated only by reference to the appended claims.

What is claimed is:

1. An alarm system which comprises
   a communicator unit including a memory unit and at least one alarm sensor unit and adapted for connection to a telephone line,
   a central receiver adapted for connection to the telephone line to receive and transmit signals between it and said communicator unit,
   means in said communicator unit for delivering signals to said central receiver representing conditions of alarm, trouble and/or restoral, opening and closing, of said sensor unit, and
   means detachably connected to said communicator unit for programming said memory unit and sensor unit or units for selected operating states.

2. An alarm system according to claim 1 which comprises
   means for displaying the character and location of the alarm condition at said communicator unit.

3. An alarm system according to claim 1 which comprises
   means operable to selectively activate operation of said sensor unit.

4. An alarm system according to claim 3 wherein said activating means includes means including a numerical combination therefor.

5. An alarm system according to claim 1 which comprises
   a test unit detachably connectable to said communicator unit for testing operation of said alarm sensor.

6. An alarm system according to claim 5 wherein said test unit is arranged to indicate the status of said alarm sensor circuit as closed, open or normal.

7. An alarm system according to claim 1 wherein said communicator unit includes a plurality of alarm sensor units.

8. An alarm system according to claim 7 which comprises
means for selectively activating certain of said alarm sensor units.

9. An alarm system according to claim 1 which comprises
means for indicating proper transmission of data from said communicator unit to said central receiver by transmission of a parity digit.

10. An alarm system according to claim 1 which comprises
a separate transmitter connected to said communicator unit and arranged to generate signals representative of normal operation, an alarm condition, or a system malfunction such as a line break, and
a separate receiver connected to receive input signals from said separate transmitter.

11. An alarm system according to claim 1 wherein said central receiver includes means for printing received data in an alpha-numeric readable format.

12. In an alarm system,
a communicator unit including a memory unit and at least one alarm sensor unit constituting a loop sensor circuit having alarm, trouble, and normal operating states, and
a programmer unit detachably connected to said communicator unit and arranged to program said memory unit and sensor circuit for selected operating states.

13. In an alarm system according to claim 12,
said programmer unit being arranged to activate selected control signals in said communicator unit in response to the particular operating states in said loop sensor circuit.

14. In an alarm system according to claim 12,
said communicator unit including a plurality of loop sensor circuits,
said programmer unit being arranged to individually program each of said loop sensor circuits.

* * * * *